(12) United States Patent
Kanenari (10) Patent No.: US 8,776,588 B2
(45) Date of Patent: Jul. 15, 2014

(54) TRANSMISSION DEVICE FOR TRANSMITTING INFORMATION ABOUT TIRE CONDITION AND TIRE CONDITION MONITORING SYSTEM (75) Inventor: Daisuke Kanenari, Hiratsuka (JP)

(73) Assignee: The Yokohama Rubber Co., Ltd., Tokyo (JP)

( * ) Notice: Subject to any disclaimer, the term of this patent is extended or adjusted under 35 U.S.C. 154(b) by 148 days.

(21) Appl. No.: 13/509,526

(22) PCT Filed: Nov. 10, 2010

(86) PCT No.: PCT/JP2010/006600
§ 371 (c)(1),
(2), (4) Date: May 11, 2012

(87) PCT Pub. No.: WO2011/058744
PCT Pub. Date: May 19, 2011

(65) Prior Publication Data
US 2012/0234086 A1 Sep. 20, 2012

(30) Foreign Application Priority Data
Nov. 16, 2009 (JP) .................................. 2009-261035

(51) Int. Cl.
G01M 17/02 (2006.01)
B60C 23/02 (2006.01)
B60C 23/04 (2006.01)

(52) U.S. Cl.
CPC ......... *B60C 23/0408* (2013.01); *B60C 23/0494* (2013.01)
USPC ........................................... 73/146; 340/445

(58) Field of Classification Search
USPC ............................................... 73/146–146.8
See application file for complete search history.

(56) References Cited

U.S. PATENT DOCUMENTS 6,630,885 B2    10/2003 Hardman et al.
6,959,597 B2 *  11/2005 Ito et al. ....................... 73/146.8
(Continued)

FOREIGN PATENT DOCUMENTS

EP    0 985 560 A2    3/2000
FR    2 884 610 A1    10/2006
(Continued)

OTHER PUBLICATIONS

The Office Action of the corresponding Korean Patent Application No. 10-2012-7009085, dated Jul. 14, 2013.
Taiwanese Office Action of the corresponding Taiwanese Patent Application No. 099139373, dated Dec. 24, 2013.
International Search Report of corresponding International Application No. PCT/JP2010/006600, dated on Feb. 10, 2010.
(Continued)

*Primary Examiner* — Andre Allen
(74) *Attorney, Agent, or Firm* — Global IP Counselors, LLP (57) ABSTRACT A tire condition monitoring system includes a transmission device, a receiving device, and a monitoring section. The transmission device includes a sensor, a transmitter, a housing, and a engaged member. The sensor detects, as the tire information, a condition of gas filled in the tire cavity area surrounded with the tire and a rim. The transmitter wirelessly transmits the detected tire information. The housing houses the sensor and the transmitter, including an inner space and a through hole. The inner space is surrounded with a wall of the housing and is separated from the tire cavity area. The through hole passes through the wall. The engaged member is engaged with the through hole to be provided to the housing. The engaged member includes one of an air vent and a communication groove for communicating between the tire cavity area and the inner space.

20 Claims, 8 Drawing Sheets (56) References Cited

U.S. PATENT DOCUMENTS

| | | | |
|---|---|---|---|
| 7,215,244 B2* | 5/2007 | Katou et al. | 340/447 |
| 7,352,276 B2* | 4/2008 | Katou | 340/445 |
| 2004/0050170 A1 | 3/2004 | Koch et al. | |
| 2008/0055059 A1* | 3/2008 | Murakami | 340/442 |
| 2010/0024539 A1 | 2/2010 | Hamm et al. | |
| 2010/0328059 A1* | 12/2010 | Kanenari | 340/447 |
| 2012/0222478 A1* | 9/2012 | Kanenari et al. | 73/146.5 |
| 2012/0229266 A1* | 9/2012 | Kanenari | 340/445 |
| 2012/0235808 A1* | 9/2012 | Kanenari et al. | 340/445 |
| 2013/0298658 A1* | 11/2013 | Kanenari | 73/146.4 |
| 2014/0060171 A1* | 3/2014 | Hu | 73/146.8 |

FOREIGN PATENT DOCUMENTS

| | | | |
|---|---|---|---|
| JP | 2004-526217 A | 8/2004 |
| JP | 2006-074351 A | 3/2006 |
| JP | 2006-234481 A | 9/2006 |
| JP | 2007-196834 A | 8/2007 |
| JP | 2007-296966 A | 11/2007 |
| JP | 2008-062730 A | 3/2008 |

OTHER PUBLICATIONS

Japanese Office Action of the corresponding Japanese Application No. 2009-261035, dated May 18, 2010.

* cited by examiner

TRANSMISSION DEVICE FOR TRANSMITTING INFORMATION ABOUT TIRE CONDITION AND TIRE CONDITION MONITORING SYSTEM

CROSS-REFERENCE TO RELATED APPLICATIONS

This U.S. National stage application claims priority under 35 U.S.C. §119(a) to Japanese Patent Application No. 2009-261035, filed in Japan on Nov. 16, 2009, the entire contents of Japanese Patent Application No. 2009-261035 are hereby incorporated herein by reference.

BACKGROUND

1. Field of the Invention

The present invention relates to a transmission device provided in a tire cavity area to transmit tire information about a tire condition and a tire condition monitoring system for determining whether a tire anomaly is caused.

2. Background Information

Conventionally, a check and control of air pressure of a tire mounted to a vehicle are desired for improvement of tire durability, improvement of wear resistance, improvement of fuel economy, or improvement of ride quality, and improvement of handling performance. For this purpose, various systems for monitoring tire pressure have been proposed. In such a system, in general, information about the air pressure of the tire mounted to a wheel is detected, a transmission device for transmitting the information is provided in a tire cavity area of each wheel, and the information of the air pressure of each tire is obtained from the transmission device to monitor the air pressure of the tire.

On the other hand, when a tire goes flat, a puncture repair agent to be injected into a tire cavity area located between the tire and a rim is often used. Because the puncture repair agent is a liquid, the agent adheres to the transmission device provided in the tire cavity area as well as a tire inner surface facing the tire cavity area when the agent is injected into the tire cavity area. In some cases, the agent becomes solidified to close an opening portion formed in the transmission device to affect measurement of the air pressure.

To cope with this problem, a wheel condition detection device capable of maintaining a normal detection condition by preventing entry of foreign matter through a communication portion for detection has been proposed (Japanese Patent Application Laid-Open No. 2008-62730).

To put it concretely, a TPMS (Tire Pressure Monitoring System) valve of the wheel condition detection device is provided with a communication portion opening and closing mechanism for opening and closing a communication hole formed in a housing. At the time of puncture repair, entry of the puncture repair agent into a detection space through the communication hole is prevented. This communication portion opening and closing mechanism is made up of mechanical bodies including a lid body and a torsion coil spring and automatically opens and closes the communication hole by centrifugal force acting on a wheel.

Moreover, there are proposed a tire pressure monitoring system and a tire pressure sensor unit for informing an occupant that tire pressure may drop after a punctured tire is fixed by using a tire puncture repair agent (Japanese Patent Application Laid-Open No. 2007-196834).

To put it concretely, the tire pressure monitoring system is provided to each tire of a vehicle and is provided with a sensor unit having a tire pressure sensor and a transmitter, a receiving device for receiving a radio wave from the sensor unit, and a control ECU for giving an alarm when the air pressure of each tire becomes lower than or equal to a threshold value. The system is provided with a puncture determination means for determining puncture of each tire and a puncture repair agent use determination means for determining whether or not the punctured tire was repaired by using the puncture repair agent after it was determined that the tire blew out. When it was determined that the punctured tire was repaired by using the puncture repair agent, the control ECU continues the alarm even if the tire pressure value from the air pressure sensor is a normal value.

Because the communication portion opening and closing mechanism of the device described in Japanese Patent Application Laid-Open No. 2008-62730 is made up of the mechanical bodies including the lid body and the torsion coil spring, the device itself is complicated and expensive. In the system and the unit described in Japanese Patent Application Laid-Open No. 2007-196834, it is not certain whether or not the information about the tire pressure measured after the repair of the tire by using the puncture repair agent is correct. Therefore, it is impossible to determine whether a tire anomaly after the puncture repair is caused.

SUMMARY

Therefore, an object of the present invention is to provide a transmission device capable of appropriately detecting and transmitting tire information such as tire pressure information even after tire puncture repair by using a puncture repair agent, and a tire condition monitoring system for determining whether a tire anomaly is caused.

According to one aspect of the invention, there is provided with a transmission device provided in a tire cavity area to transmit tire information about a condition of a tire.

The transmission device includes:

a sensor which detects, as the tire information, a condition of gas filled in the tire cavity area surrounded with the tire and a rim;

a transmitter which wirelessly transmits the detected tire information;

a housing which houses the sensor and the transmitter, including an inner space and a through hole, the inner space surrounded with a wall of the housing and separated from the tire cavity area, and the through hole passing through the wall; and an engaged member which is engaged with the through hole to be provided to the housing; the engaged member including one of an air vent and a communication groove for communicating between the tire cavity area and the inner space.

According to other aspect of the invention, there is provided with a tire condition monitoring system including:

a transmission device; a receiving device; and a monitoring section

The transmission device includes:

a sensor which detects, as the tire information, a condition of gas filled in the tire cavity area surrounded with the tire and a rim;

a transmitter which wirelessly transmits the detected tire information;

a housing which houses the sensor and the transmitter, including an inner space and a through hole, the inner space surrounded with a wall of the housing and separated from the tire cavity area, and the through hole passing through the wall; and an engaged member which is engaged with the through hole to be provided to the housing; the engaged member including one of an air vent and a communication groove for communicating between the tire cavity area and the inner space.

The receiving device receives the tire information transmitted from the transmitter.

The monitoring section determines whether a tire anomaly is caused and informs a determination result.

DETAILED DESCRIPTION OF EMBODIMENTS

A transmission device and a tire condition monitoring system of the present invention will be described below in detail.

Figure 1:
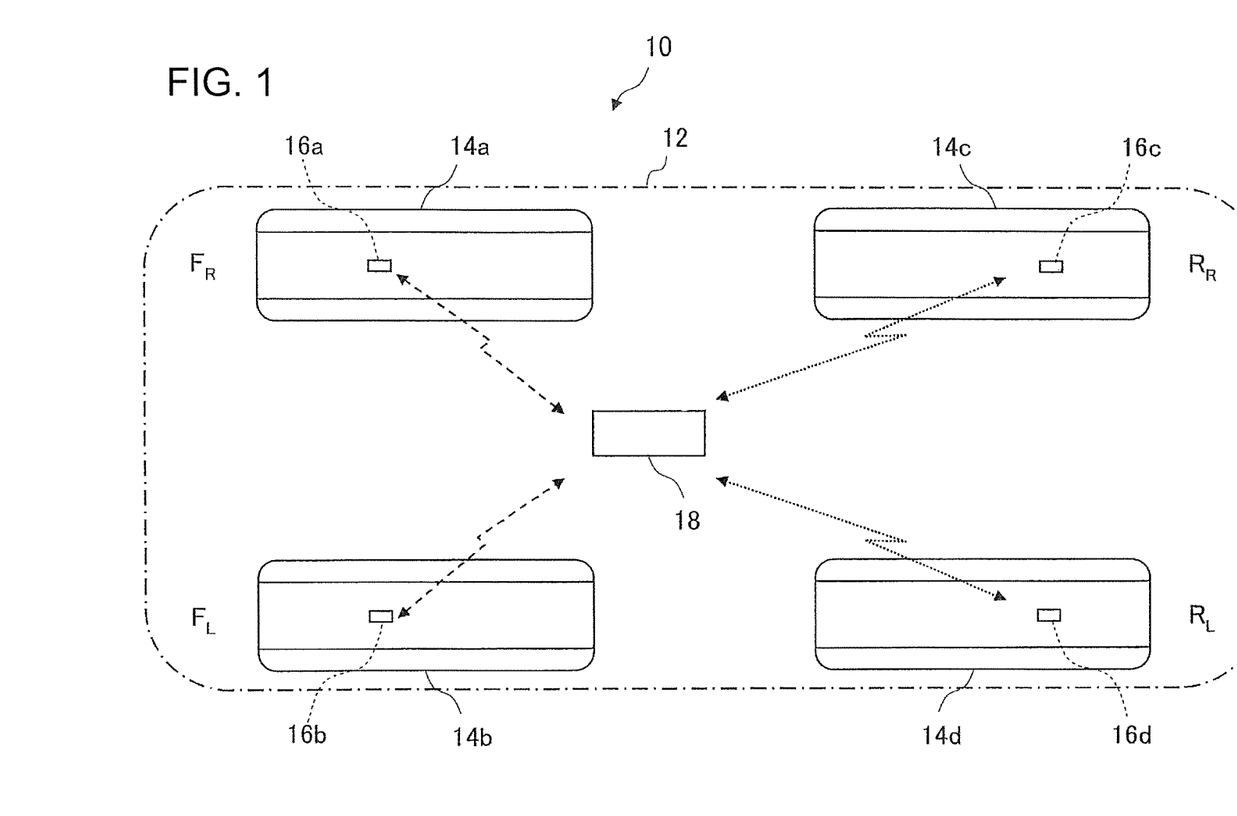
FIG. 1 is a general overview diagram of a tire pressure monitoring system which is an embodiment of a tire condition monitoring system.

FIG. 1 is a general overview diagram of a tire pressure monitoring system 10 which is an embodiment of the tire condition monitoring system.

The tire pressure monitoring system (hereafter referred to as "system") 10 is mounted on a vehicle 12. The system 10 includes air pressure information transmission devices (hereafter referred to as "transmission devices") 16a, 16b, 16c, and 16d provided in respective tire cavity areas in tires 14a, 14b, 14c, and 14d of respective wheels of the vehicle 12 and a monitoring device 18.

All of the transmission devices 16a, 16b, 16c, and 16d detect information about pressure of air filled into the tire cavity areas surrounded with the tires and rims as tire information and wirelessly transmit the tire information to the monitoring device 18. Hereafter, to explain all of the transmission devices 16a, 16b, 16c, and 16d at a time, the transmission devices 16a, 16b, 16c, and 16d will be collectively referred to as transmission devices 16.

Figure 2:
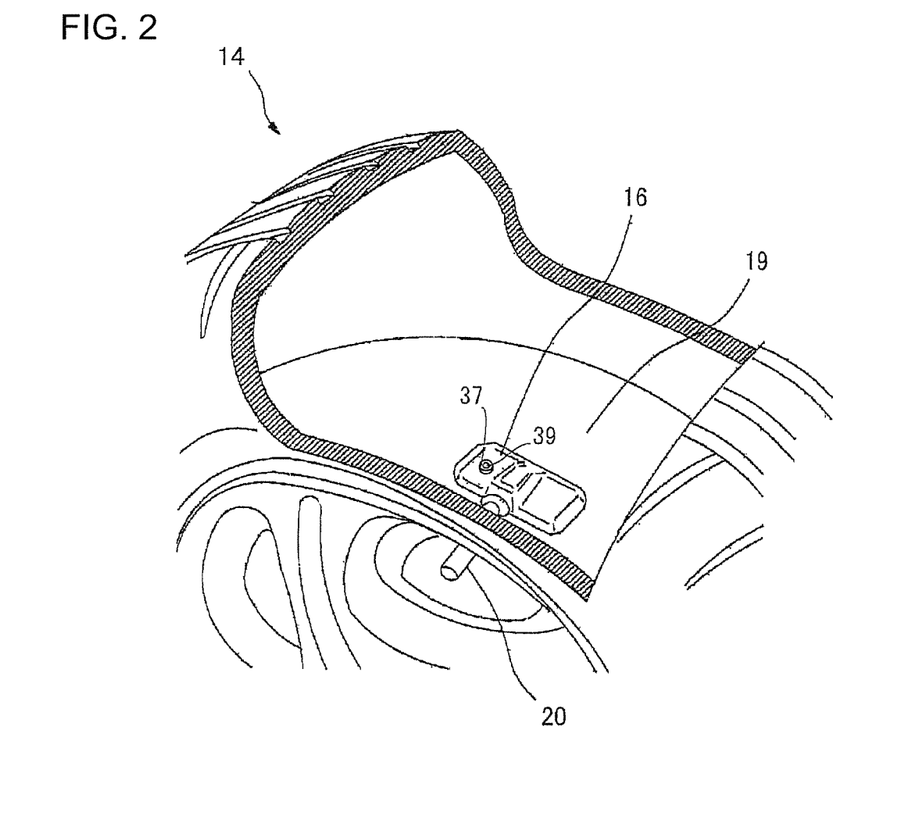
FIG. 2 is a drawing for explaining an example of a method for fixing a transmission device illustrated in FIG. 1 in a tire cavity area.
Figure 3:
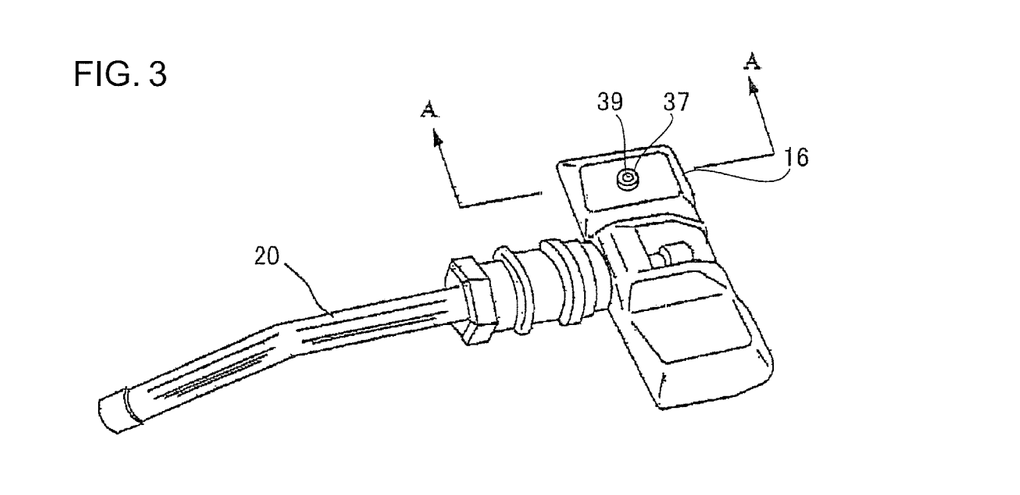
FIG. 3 is a perspective view of an entire device in which a transmission device illustrated in FIG. 2 is integrated with a tire valve.

FIG. 2 is a drawing for explaining an example of a method for fixing the transmission device 16 in the tire cavity area. FIG. 3 is a perspective view of an entire device in which the transmission device 16 illustrated in FIG. 2 is integrated with a tire valve 20.

The transmission device 16 is provided to an end portion of the tire valve 20 extending on a side of the tire cavity area and is fixed and disposed in the tire cavity area by mechanically fixing the tire valve 20 to the rim 19.

Figure 4:
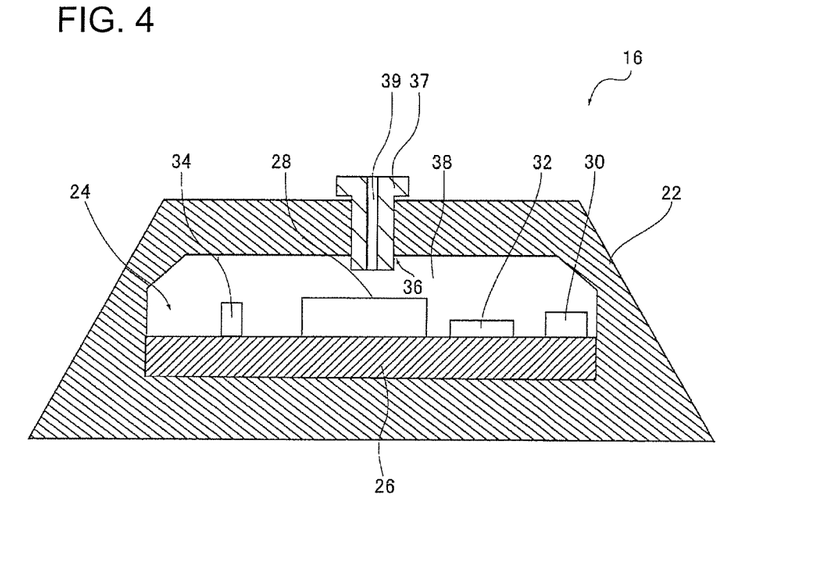
FIG. 4 is a sectional view of the transmission device taken along a line of A-A illustrated in FIG. 3.

FIG. 4 is a sectional view of the transmission device 16 along a line of A-A illustrated in FIG. 3. As illustrated in FIG. 4, the transmission device 16 includes a housing 22, a circuit 24 provided in the housing 22 and a engaged member 37. The circuit 24 includes a substrate 26 and a sensor unit 28, a transmitter 30, a processing unit 32, a power supply section 34, and an antenna 40 (see FIG. 5) provided to the substrate 26.

Figure 5:
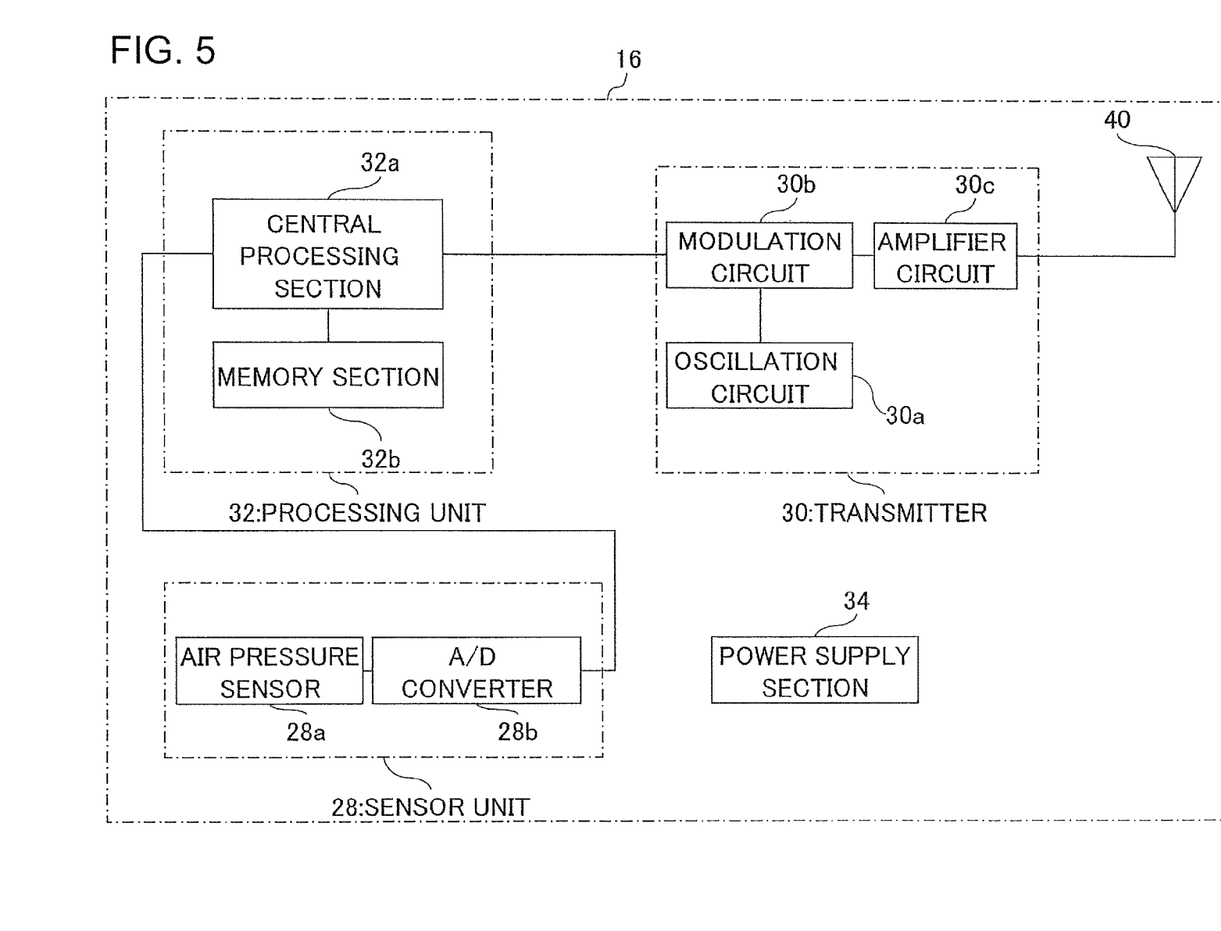
FIG. 5 is a circuit block diagram of the transmission device illustrated in FIG. 1.

FIG. 5 is a circuit block diagram of the transmission device 16.

The sensor unit 28 includes an air pressure sensor 28a and an A/D converter 28b. The air pressure sensor 28a senses the air pressure in an inner space 38 in the housing 22 and outputs a pressure signal. The inner space 38 in the housing 22 communicates with the space in the tire cavity area through an air vent 39 (see FIG. 4) provided in the engaged member 37.

The A/D converter 28b carries out digital conversion of the pressure signal output from the air pressure sensor 28a and outputs pressure data.

The processing unit 32 includes a central processing section 32a and a memory section 32b. The central processing section 32a operates based on a program stored in a semiconductor memory of the memory section 32b. When the central processing section 32a is powered and driven, it carries out control so that the pressure data, which is information about the air pressure and sent from the sensor unit 28, is transmitted to the monitoring device 18 via the transmitter 30 at predetermined time intervals, e.g., every five minutes. Identification information unique to the transmission device 16 is stored in advance in the memory section 32b and the central processing section 32a carries out control so that the identification information is transmitted to the monitoring device 18 together with the pressure data.

The memory section 32b includes a ROM for storing the program for operation of the central processing section 32a and rewritable nonvolatile memory such as an EEPROM. The identification information unique to the transmission device 16 is stored in an unwritable area in the memory section 32b.

The transmitter 30 includes an oscillation circuit 30a, a modulation circuit 30b, and an amplifier circuit 30c.

The oscillation circuit 30a generates a carrier signal, e.g., an RF signal belonging to a 315 MHz frequency band.

The modulation circuit 30b modulates the carrier signal by using the pressure data sent from the central processing section 32a and the identification information unique to the transmission device 16 to generate a transmitting signal. As a modulation method, a method such as amplitude shift keying (ASK), frequency modulation (FM), frequency shift keying (FSK), phase modulation (PM), and phase shift keying (PSK) can be used.

The amplifier circuit 30c amplifies the transmitting signal generated by the modulation circuit 30b and wirelessly transmits the transmitting signal to the monitoring device 18 via the antenna 40.

A secondary battery, for example, is used as the power supply section 34 to almost permanently supply electric power to the sensor unit 28, the transmitter 30, and the processing unit 32.

The housing 22 which houses the above described circuit 24 is provided with a through-hole 36 which passes completely through the wall of the housing 22 surrounding the inner space 38. The housing 22 is provided with the engaged member 37, the member 37 engaged with the through-hole 36 of the housing 22. The engaged member 37 includes the air vent 39 passing completely through the engaged member 37 and linking between the tire cavity area and the inner space 38 of the housing 22.

The engaged member 37 has a diameter of its outer periphery corresponding to a diameter of the inner periphery of the through-hole 36, so that the engaged member 37 is engaged by a friction force from the inner surface of the through-hole 36. Therefore, the engaged member 37 can be replaced by pulling out the engaged member 37 when the tire is dismounted from the rim.

The reason why the engaged member is replaceable is that the communication can be maintained between the inner space 38 of the housing and the tire cavity area even when the puncture repair agent is injected into the tire cavity area. Even if the air vent 39 is closed by the puncture repair agent, a new engaged member 39 can be easily replaced with by pulling out the engaged member 39 whose air vent 39 is closed.

The surface of the region in the periphery of the opening portion of the air vent 39 is preferably a water repellant face. The surface of the region in the periphery of the opening portion of the through-hole 36 is also preferably a water repellant face. As material of the water repellent face, silicon-based resin, fluorine-based resin, a modified resin obtained by grafting an organosilyl group or a fluoroalkyl group, or the like is used. Alternatively, the surface of the region in the periphery of the opening portion of the air vent 39 or the through-hole 36 may be provided with microscopic asperities that exert water repellency. By making the face water repellent, the puncture repair agent is likely to be repelled and becomes less likely to adhere to the face and it is possible to decrease the likelihood of the blockage of the air vent 39.

Although the transmission device 16 in the embodiment detects the pressure of the air filled in the tire cavity area as a condition of the tire, the condition of the tire to be detected may include temperature of the air in the tire cavity area as well as the air pressure.

Moreover, the transmission device 16 may not only be fixed to the tire valve 20 but also be fixed directly to an inner surface of the tire which faces the tire cavity area or to a surface of the rim 19 which faces the tire cavity area.

Figure 6:
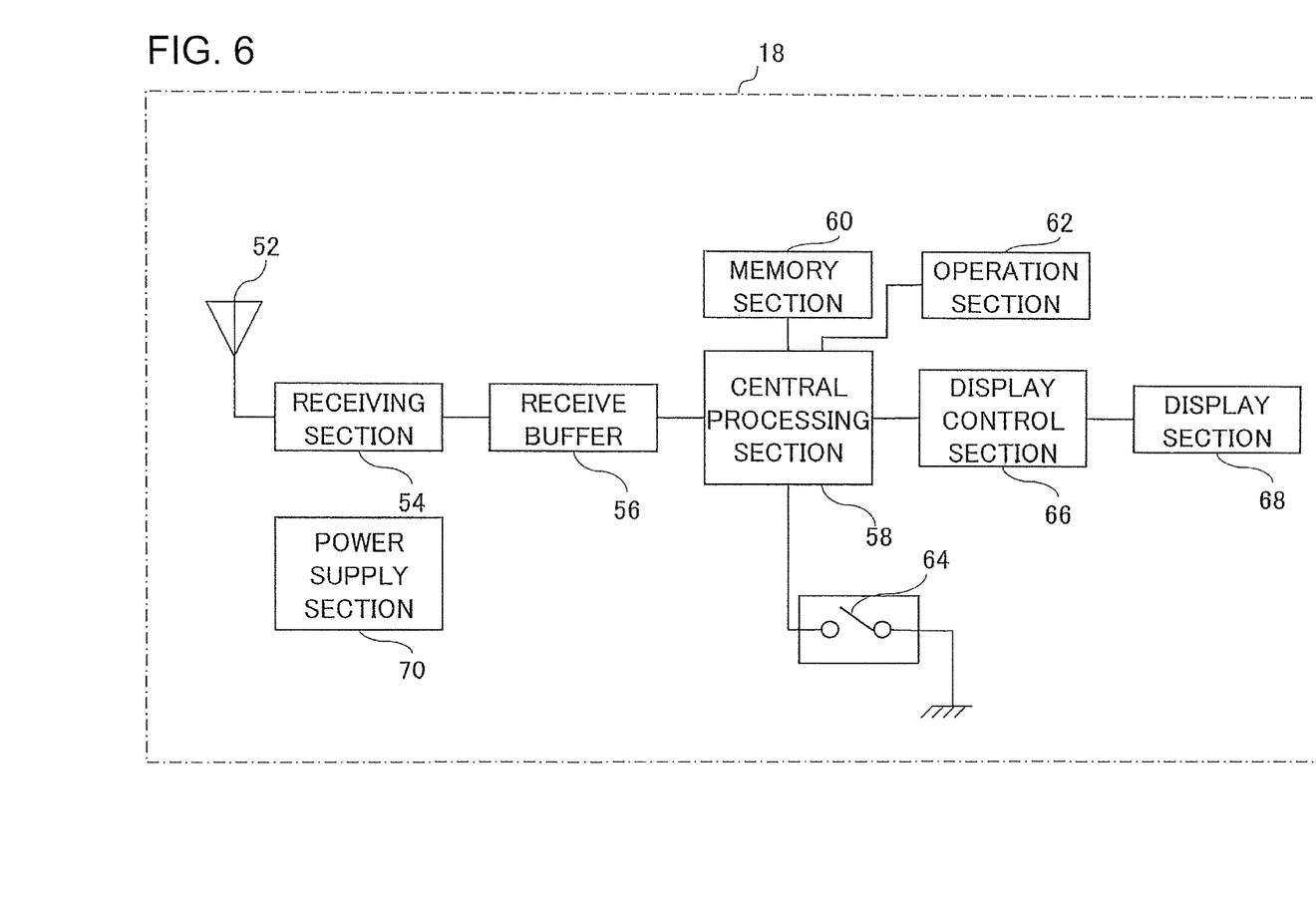
FIG. 6 is a circuit block diagram of a monitoring device illustrated in FIG. 1.

FIG. 6 is a circuit block diagram of the monitoring device 18.

The monitoring device 18 is installed in front of a position of a driver's seat of the vehicle 12, for example, and informs a driver of the information about the air pressure. The monitoring device 18 includes an antenna 52, a receiving section 54, a receive buffer 56, a central processing section 58, a memory section 60, an operation section 62, a switch 64, a display control section 66, a display section 68, and a power supply section 70.

Frequency of the antenna 52 is matched to transmit frequency of the transmission device 16 and the antenna 52 is connected to the receiving section 54.

The receiving section 54 receives the transmitting signal of a predetermined frequency and sent from the transmission device 16 and demodulates the signal to take out the pressure data and the data of the identification information. These pieces of data are output to the receive buffer 56.

The receive buffer 56 temporarily stores the pressure data and the data of the identification information output from the receiving section 54. The stored pressure data and the data of the identification information are output to the central processing section 58 according to a direction of the central processing section 58.

The central processing section 58 is mainly made up of a CPU and operates based on a program stored in the memory section 60. The central processing section 58 monitors the air pressure of each of the tires 14a to 14d for each piece of identification information based on the received pressure data and data of the identification information. To put it concretely, the central processing section 58 determines whether a tire anomaly is caused based on the pressure data and informs a determination result. Determination of whether the tire anomaly is caused is to determine whether or not the air pressure dropped to an abnormally low level or dropped sharply in a short period of time to show that the tire blew out, for example.

The central processing section 58 outputs a determination result to the display control section 66 and causes the display section 68 to output the determination result through the display control section 66.

Furthermore, the central processing section 58 initializes a communication method and the like with the transmission device 16 according to information from the operation section 62 and information from the switch 64. Moreover, the central processing section 58 can set determination conditions for determining whether the tire anomaly is caused according to the information from the operation section 62.

The memory section 60 includes a ROM for storing the program for operation of the CPU of the central processing section 58 and a nonvolatile memory such as an EEPROM. A table of the communication method with the transmission device 16 is stored in the memory section 60 during manufacture. The transmission device 16 and the monitoring device 18 communicate with each other by the above-described communication method at an early stage. The communication method table includes information such as a communication protocol, a transmission bit rate, and a data format corresponding to the identification information unique to the transmission device 16. Settings of these pieces of information can be more freely changed by means of input from the operation section 62.

The operation section 62 includes an input device such as a keyboard and is used to input various kinds of information and conditions. The switch 64 is used to direct the central processing section 58 to start initialization.

The display control section 66 controls the display section 68 to display the tire pressure corresponding to the mounted position of the tire according to the determination result from the central processing section 58. At the same time, the display control section 66 carries out control to cause the display section 68 to display also the determination result that the tire has blown out, for example.

The power supply section 70 controls electric power supplied from a battery mounted to the vehicle 12 to suitable voltages and supplies them to respective portions of the monitoring device 18.

The transmission device 16 and the monitoring device 18 are formed as described above.

In the housing 22 of the transmission device 16, the engaged member including the air vent 39 is replaceably engaged with the through-hole 36 passing completely through the wall of the housing 22. Therefore, the communication can be maintained between the inner space 38 of the housing and the tire cavity area by replacing the engaged member 37 with a new one, even if the air vent 39 is closed by the puncture repair agent.

FIGS. 7A to 7D are perspective views of modifications of the engaged member 37 employed to the transmission device 16.

Figure 7A:
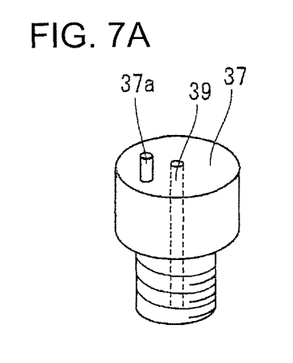
FIGS. 7A to 7D are perspective views of the engaged members other than the engaged member employed in the transmission device illustrated in FIG. 3.

The engaged member 37 has a face facing the through-hole 36 threaded and the through-hole 36 is also threaded on the inner surface thereof. The engaged member 37 includes a projection portion 37a on the end (head) portion thereof for assisting to be engage with the through-hole 36 or disengaged from the through-hole 36. The projection portion 37a is provided on the head portion of the engaged member 37 in order to assist persons to screw-out the engaged member 37 when the engaged member 37 is to be disengaged. The air vent 39 extends between the head portion of the engaged member 37 and the opposite end (bottom) portion of the engaged member 37.

Figure 7B:
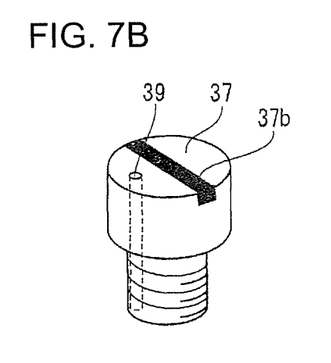
Figure 7C:
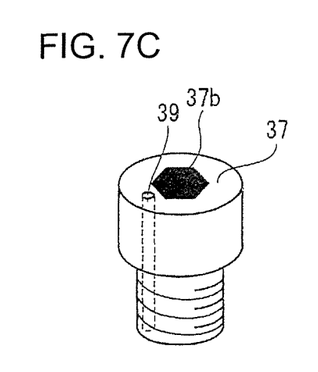
Figure 7D:
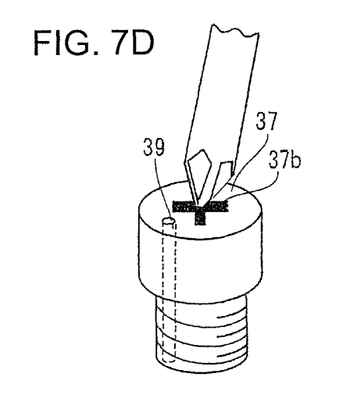

Alternatively, the head portion of the engaged member 37 may include a recessed portion for assisting to be engaged with the through-hole 36 or disengaged from the through-hole 36, in other word, a recessed portion 37b formed in a "−" shape for putting the end portion of a screw driver thereinto, as illustrated in FIG. 7B. The recessed portion 37b may be formed for putting the end portion of a hexagon wrench thereinto, as illustrated in FIG. 7C. Further, the engaged member 37 may include the recessed portion 37b formed in a "+" shape for putting the end portion of a screw driver and screwing out, as illustrated in FIG. 7D. The air vent 39 of the above described engaged member 37 is located off the center axis of the engaged member 37 and passes through the engaged member 37 between the head portion and the bottom portion.

Alternatively, the engaged member 37 may be formed in the shapes as illustrated in FIGS. 8A to 8G.

The engaged member 37 is provided with a protruding portion 37c so that the opening portion of the air vent 39 is formed on the top portion of the engaged member 37 as illustrated in FIGS. 8A to 8E. Since the opening portion of the air vent 39 is formed on the top portion of the engaged member 37, the puncture repair agent is likely to slip off an inclined face of the protruding portion 37c and less likely to remain on the top portion due to the tire rotation, even if the puncture repair agent is adhered to the top portion of the engaged member 37. Preferably, the inclined face of the protruding portion 37c around the opening portion is a water repellant face. As material of the water repellent face, silicon-based resin, fluorine-based resin, a modified resin obtained by grafting an organosilyl group or a fluoroalkyl group, or the like is used. Alternatively, the inclined face may be provided with microscopic asperities that exert water repellency. By making the inclined face water repellent, the puncture repair agent is less likely to close the air vent 39.

Figure 8A:
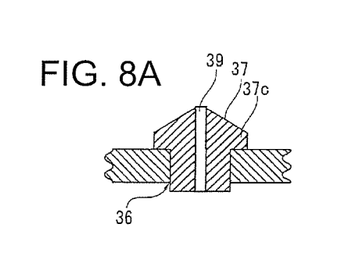
FIGS. 8A to 8G are drawings for explaining examples of the engaged members other than the engaged members illustrated in FIGS. 7A to 7D.
Figure 8B:
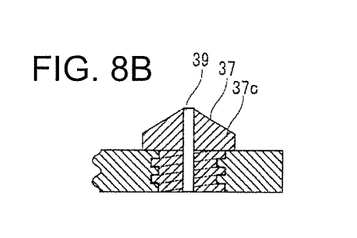
Figure 8C:
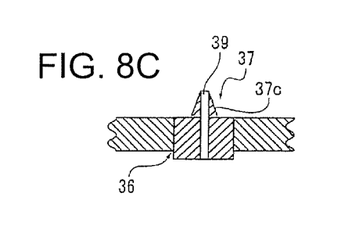
Figure 8D:
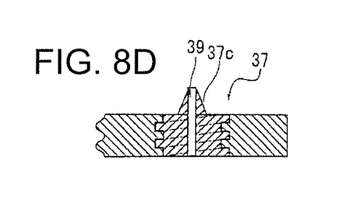
Figure 8E:
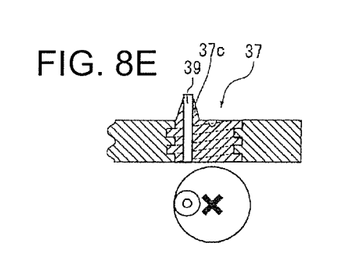

As in each of the examples illustrated in FIGS. 8A and 8C, the engaged member 37 may be mounted to the housing 22 by engaging the member 37 with the through-hole 36 by friction or may be mounted by fitting or press fitting. Alternatively, as illustrated in FIGS. 8B, 8D, and 8E, the engaged member 37 may be mounted to the housing 22 by screwing in.

Figure 8F:
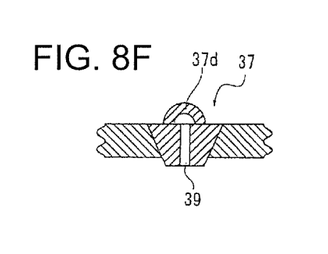

Further, a projected grip portion 37d may be provided to the head portion of the engaged member 37 which is to be engaged on the housing 22, as illustrated in FIG. 8F. The engaged member 37 can be easily disengaged from the housing 22 by hooking the projected grip portion 37d with a wire member such as steel wire and pulling the wire member.

Figure 8G:
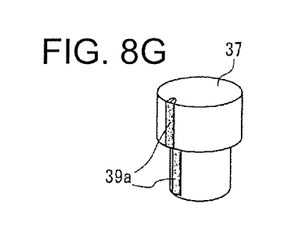

Still further, the engaged member 37 may include a communication groove 39a on the side surface of the engaged member 37 in stead of the air vent 39 extending between the head portion and the bottom portion. The inner space 38 of the housing 22 and the tire cavity area can communicate each other through the communication groove 39a.

A surface of the region around the opening portion of the air vent 39 or the communication groove 39a of each engaged member illustrated in FIGS. 8A to 8G, is also preferable to be made water repellant.

Figure 9A:
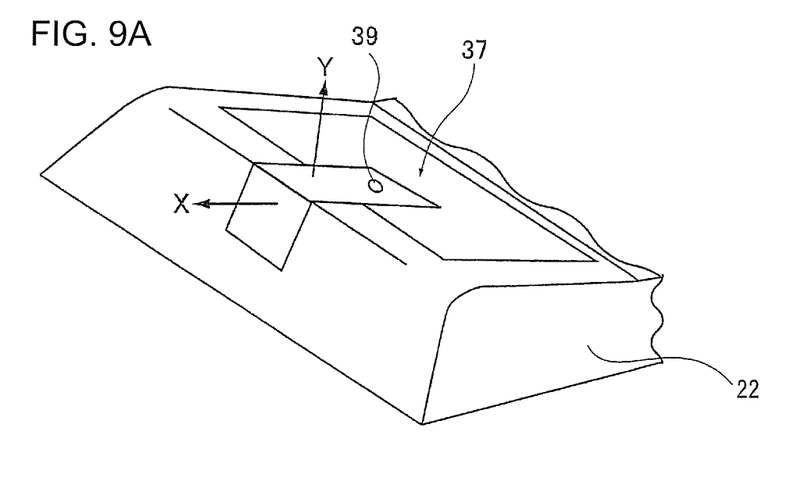
FIGS. 9A and 9B are drawings for explaining examples of the engaged members still other than the engaged members illustrated in FIGS. 7A to 7D.
Figure 9B:
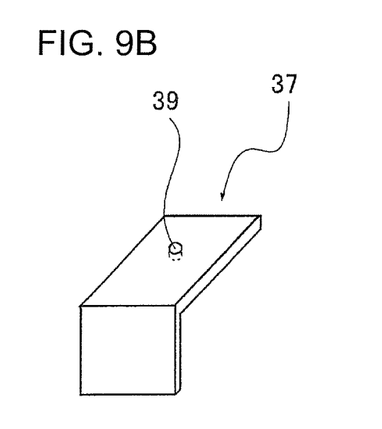

FIGS. 9A and 9B are drawings for explaining still other examples of the engaged member 37. The engaged member 37 including the air vent 39 is provided to the housing 22 as a part of the housing 22 so as to cover a cut out portion of the housing 22. In this case, the cut out portion corresponds to the through hole which passes completely through the inner space 38 of the housing 22 and the tire cavity area. The engaged member 37 is disengaged from the body of the housing 22 by sliding the engaged member 37 in a X direction or a Y direction. Therefore, when the puncture repair agent enters and closes the air vent 39, the tire is dismounted from the rim and the engaged member 37 can be replaced with a new one, thereby maintaining the operation of the transmission device 16.

The engaged member 37 may be a flexible member formed by open cell structured foams as air vents. For instance, a urethane foam or a rubber sponge is used as the flexible member, which is provided to the housing 22 by fitting the through hole 36.

Although the transmission device and the tire condition monitoring system according to the invention have been described above in detail, the transmission device and the tire condition monitoring system according to the invention are not limited to the embodiments described above but may be improved or modified in various ways without departing from the gist of the invention.

The invention claimed is:

1. A transmission device provided in a tire cavity area to transmit tire information about a condition of a tire, the transmission device comprising:
   a sensor configured to detect, as the tire information, a condition of gas filled in the tire cavity area surrounded with the tire and a rim;
   a transmitter configured to wirelessly transmit the detected tire information;
   a housing which houses the sensor and the transmitter, the housing including a wall that separates an inner space of the housing from the tire cavity area, the wall defining a through hole passing through the wall; and
   an engaged member which is engaged with the through hole from an outside of the housing and is replaceable from the outside of the housing, the engaged member including one of an air vent and a communication groove configured to communicate between the tire cavity area and the inner space.

2. The transmission device according to claim 1, wherein the engaged member includes an end portion that protrudes from the through hole, and a recessed portion or a projection portion is provided at the end portion for assisting in engagement of the engaged member with the through hole or disengagement of the engaged member from the through hole.

3. The transmission device according to claim 1, wherein contact surfaces of the engaged member and the through hole are threaded respectively, and threads of the engaged member engage with threads of the through hole to engage the engaged member with the through hole.

4. The transmission device according to claim 1, wherein the engaged member is a flexible member including open cell structured foam as the air vent.

5. The transmission device according to claim 1, wherein a region around a periphery of an opening portion of the air vent includes a water repellant surface.

6. The transmission device according to claim 1, wherein a region around a periphery of an opening portion of the through hole includes a water repellant surface.

7. The transmission device according to claim 1, wherein
the engaged member is replaceably engaged with the through hole, an end portion of the engaged member includes a protruding portion, and an opening portion of the air vent is formed at a top portion of the protruding portion.

8. A tire condition monitoring system comprising:
a transmission device including:
   a sensor configured to detect, as the tire information, a condition of gas filled in the tire cavity area surrounded with the tire and a rim;
   a transmitter configured to wirelessly transmit the detected tire information;
   a housing which houses the sensor and the transmitter, the housing including a wall that separates an inner space of the housing from the tire cavity area, and the wall defining a through hole passing through the wall; and
   an engaged member which is engaged with the through hole from an outside of the housing and is replaceable from the outside of the housing, the engaged member including one of an air vent and a communication groove configured to communicate between the tire cavity area and the inner space;
a receiving device configured to receive the tire information transmitted from the transmitter; and
a monitoring section configured to determine whether a tire anomaly is caused and provide a determination result.

9. The transmission device according to claim 2, wherein
contact surfaces of the engaged member and the through hole are threaded respectively, and threads of the engaged member engage with threads of the through hole to engage the engaged member with the through hole.

10. The transmission device according to claim 2, wherein
a region around a periphery of an opening portion of the air vent includes a water repellant surface.

11. The transmission device according to claim 2, wherein
a region around a periphery of an opening portion of the through hole includes a water repellant surface.

12. The transmission device according to claim wherein
the engaged member is replaceably engaged with the through hole, an end portion of the engaged member includes a protruding portion, and an opening portion of the air vent is formed at a top portion of the protruding portion.

13. The tire condition monitoring system according to claim 8, wherein
the engaged member includes an end portion that protrudes from the through hole, and a recessed portion or a projection portion is provided at the end portion for assisting in engagement of the engaged member with the through hole or disengagement of the engaged member from the through hole.

14. The tire condition monitoring system according to claim 8, wherein
contact surfaces of the engaged member and the through hole are threaded respectively, and threads of the engaged member engage with threads of the through hole to engage the engaged member with the through hole.

15. The tire condition monitoring system according to claim 8, wherein
the engaged member is a flexible member including open cell structured foam as the air vent.

16. The tire condition monitoring system according to claim 8, wherein
a region around a periphery of an opening portion of the air vent includes a water repellant surface.

17. The tire condition monitoring system according to claim 8, wherein
a region around a periphery of an opening portion of the through hole includes a water repellant surface.

18. The tire condition monitoring system according to claim 8, wherein
the engaged member is replaceably engaged with the through hole, an end portion of the engaged member includes a protruding portion, and an opening portion of the air vent is formed at a top portion of the protruding portion.

19. The tire condition monitoring system according to claim 13, wherein
contact surfaces of the engaged member and the through hole are threaded respectively, and threads of the engaged member engage with threads of the through hole to engage the engaged member with the through hole.

20. The tire condition monitoring system according to claim 13, wherein
a region around a periphery of an opening portion of the air vent includes a water repellant surface.

* * * * *